(12) United States Patent
van Riel et al.

(10) Patent No.: US 10,599,468 B2
(45) Date of Patent: Mar. 24, 2020

(54) HOUSEKEEPING VIRTUAL PROCESSOR OVERCOMMIT FOR REAL TIME VIRTUALIZATION

(71) Applicant: Red Hat, Inc., Raleigh, NC (US)

(72) Inventors: Henri van Riel, Westford, MA (US); Luiz Capitulino, Quebec (CA); Marcelo Tosatti, San Paulo (BR)

(73) Assignee: Red Hat, Inc., Raleigh, NC (US)

(*) Notice: Subject to any disclaimer, the term of this patent is extended or adjusted under 35 U.S.C. 154(b) by 72 days.

(21) Appl. No.: 15/793,308

(22) Filed: Oct. 25, 2017

(65) Prior Publication Data

US 2019/0121659 A1   Apr. 25, 2019

(51) Int. Cl.
G06F 9/48        (2006.01)
G06F 9/445       (2018.01)
G06F 9/455       (2018.01)

(52) U.S. Cl.
CPC .......... G06F 9/4843 (2013.01); G06F 9/445 (2013.01); G06F 9/45558 (2013.01)

(58) Field of Classification Search
None
See application file for complete search history.

(56) References Cited

U.S. PATENT DOCUMENTS

| | | | | |
|---|---|---|---|---|
| 5,247,675 A * | 9/1993 | Farrell | ................. | G06F 9/4881 718/103 |
| 5,838,968 A * | 11/1998 | Culbert | ................. | G06F 9/5011 718/104 |
| 6,360,243 B1 * | 3/2002 | Lindsley | ............... | G06F 9/4812 712/22 |
| 7,953,914 B2 | 5/2011 | Gollub et al. | | |
| 8,166,485 B2 * | 4/2012 | Krishnakumar | ...... | G06F 9/4881 709/224 |
| 8,347,290 B2 | 1/2013 | Srinivasan | | |
| 8,635,057 B2 * | 1/2014 | Ganguly | ............. | G06F 9/45558 703/27 |
| 8,924,655 B2 | 12/2014 | McKenney | | |

(Continued)

OTHER PUBLICATIONS

Brandenburg, "Scheduling and Locking in Multiprocessor Real-Time Operating Systems", 2011, University of North Caroline, (Year: 2011).*

(Continued)

*Primary Examiner* — Hossain M Morshed
(74) *Attorney, Agent, or Firm* — K&L Gates LLP

(57) ABSTRACT

A system includes a hypervisor, virtual machine(s), and virtual processor(s). The virtual processor(s) includes a real time virtual processor and a housekeeping virtual processor. The housekeeping virtual processor is configured to initiate a non-preemptible task and responsive to initiating the non-preemptible task, increment a counter value from an initial counter value. The housekeeping virtual processor is also configured to complete the non-preemptible task and responsive to completing the non-preemptible task, decrement the counter value towards the initial counter value. Responsive to the counter value reaching the initial counter value, the virtual housekeeping processor is configured to check a flag set by the hypervisor. Responsive to checking the flag, the housekeeping process is configured to execute a hypercall to yield a processor associated with the housekeeping virtual processor.

20 Claims, 9 Drawing Sheets

(56) References Cited

U.S. PATENT DOCUMENTS

| | | | | |
|---|---|---|---|---|
| 2012/0159482 | A1* | 6/2012 | Jeong | G06F 8/61 |
| | | | | 718/1 |
| 2014/0123135 | A1* | 5/2014 | Huang | H04L 41/5054 |
| | | | | 718/1 |
| 2014/0351819 | A1* | 11/2014 | Shah | G06F 9/4887 |
| | | | | 718/103 |
| 2017/0090999 | A1* | 3/2017 | Weber | G06F 9/528 |
| 2017/0126726 | A1* | 5/2017 | Han | G06F 9/45558 |
| 2018/0239909 | A1* | 8/2018 | Tsirkin | G06F 9/45558 |

OTHER PUBLICATIONS

McKenney, "A realtime preemption overview", 2005, Lwn.net (Year: 2005).*

CS 378, "Project 1—Paravirtual VMM", 2017, UT Texas (Year: 2017).*

Krauss, "Programming Concepts: Garbage Collection", 2017, The Code Boss, at https://thecodeboss.dev/2017/01/programming-concepts-garbage-collection/ (Year: 2017).*

Microsoft, "Hypercall APIs Explained", 2006, WinHEC (Year: 2006).*

Svensson, "Virtualization in an embedded environment", 2005, Lunds University (Year: 2005).*

WhatIs, "Virtual CPU", 2014, WhatIs.com (Year: 2014).*

Bjorn B. Brandenburg, "Scheduling and Locking in Multiprocessor Real-Time Operating Systems", 2011, A dissertation submitted to the faculty of the University of North Carolina at Chapel Hill (Year: 2011).*

* cited by examiner

HOUSEKEEPING VIRTUAL PROCESSOR OVERCOMMIT FOR REAL TIME VIRTUALIZATION

BACKGROUND

Virtualization may be used to provide some physical components as logical objects in order to allow running various software modules, for example, multiple operating systems, concurrently and in isolation from other software modules, on one or more interconnected physical computer systems. Virtualization allows, for example, consolidating multiple physical servers into one physical server running multiple virtual machines in order to improve the hardware utilization rate.

Virtualization may be achieved by running a software layer, often referred to as a hypervisor, above the hardware and below the virtual machines. A hypervisor may run directly on the server hardware without an operating system beneath it or as an application running on a traditional operating system. A hypervisor may virtualize the physical layer and provide interfaces between the underlying hardware and virtual machines. Processor virtualization may be implemented by the hypervisor scheduling time slots on one or more physical processors for a virtual machine, rather than a virtual machine actually having a dedicated physical processor. Virtual processors may execute instructions to read, write, and copy memory entries for both real time and housekeeping tasks.

SUMMARY

The present disclosure provides new and innovative systems and methods for housekeeping virtual processor overcommit for real time virtualization. In an example, a system includes a hypervisor, one or more virtual machines, and one or more virtual processors. The one or more virtual processors includes a real time virtual processor and a housekeeping virtual processor. The housekeeping virtual processor is configured to initiate a non-preemptible task and responsive to initiating the non-preemptible task, increment a counter value from an initial counter value. The housekeeping virtual processor is also configured to complete the non-preemptible task and responsive to completing the non-preemptible task, decrement the counter value towards the initial counter value. Responsive to the counter value reaching the initial counter value, the virtual housekeeping processor is configured to check a flag set by the hypervisor. Responsive to checking the flag, the virtual housekeeping processor is configured to execute a hypercall to yield a processor associated with the housekeeping virtual processor.

In an example, a method includes checking, by a hypervisor, whether a counter value on a virtual central processing unit ("VCPU") is a non-initial counter value. The counter value is incremented and decremented from an initial value. Responsive to checking the non-initial counter value, the hypervisor sets a flag. Additionally, the hypervisor resumes guest execution.

In an example, a non-transitory machine readable medium stores code, which when executed by a processor, is configured to cause a VCPU to initiate a non-preemptible task, and responsive to initiating the non-preemptible task, increment a counter value from an initial counter value. Additionally, the non-transitory machine-readable medium is configured to cause the VCPU to complete the non-preemptible task, and responsive to completing the non-preemptible task, decrement the counter value towards the initial counter value. Responsive to the counter value reaching the initial counter value, the VCPU is caused to check a flag set by a hypervisor. Additionally, the VCPU is configured to execute a hypercall to yield a CPU associated with the VCPU responsive to checking the flag.

Additional features and advantages of the disclosed method and apparatus are described in, and will be apparent from, the following Detailed Description and the Figures. The features and advantages described herein are not all-inclusive and, in particular, many additional features and advantages will be apparent to one of ordinary skill in the art in view of the figures and description. Moreover, it should be noted that the language used in the specification has been principally selected for readability and instructional purposes, and not to limit the scope of the inventive subject matter.

DETAILED DESCRIPTION OF EXAMPLE EMBODIMENTS

Figure 1A:
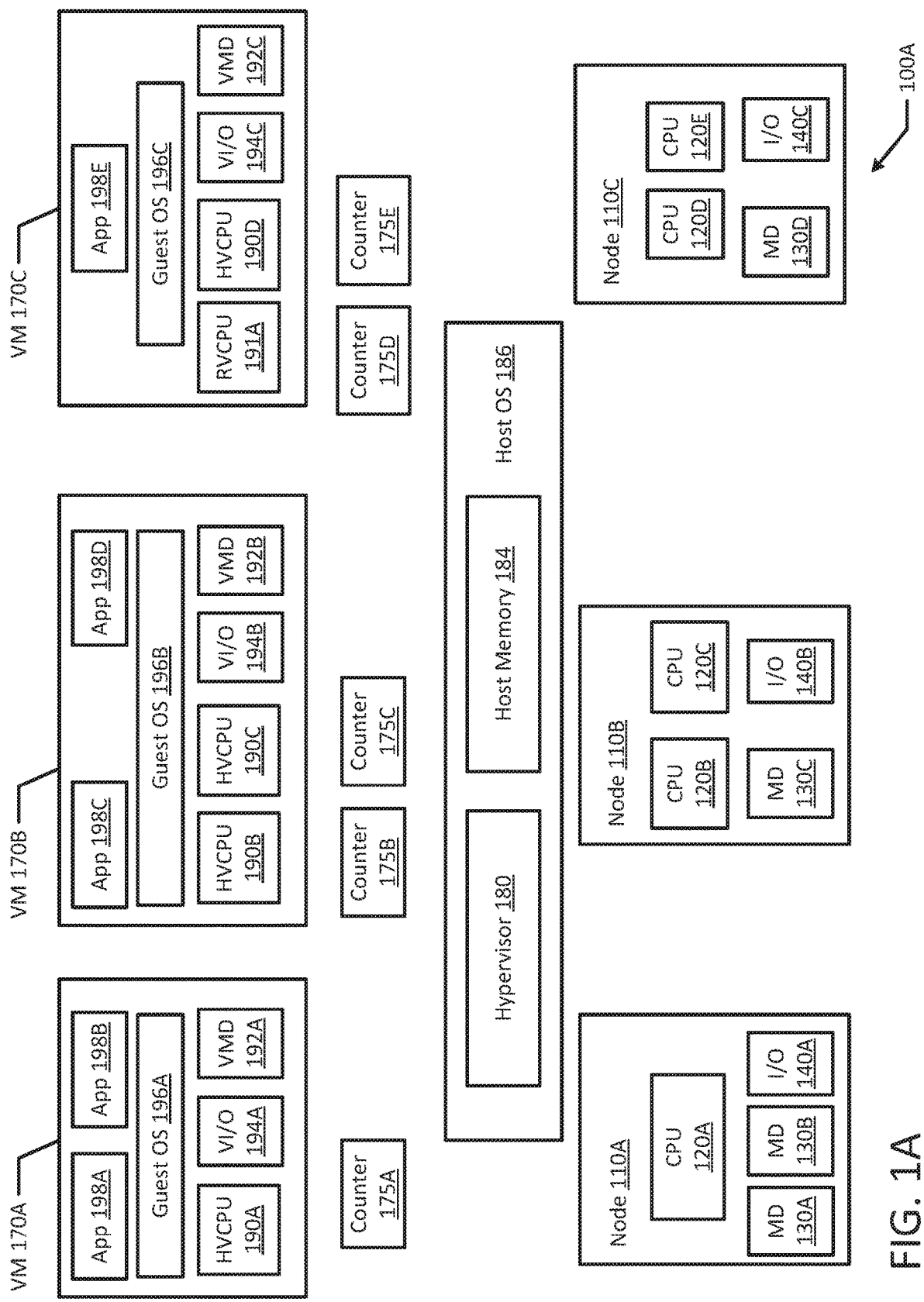
FIGS. 1A and 1B illustrate block diagrams of example computing systems according to example embodiments of the present disclosure.

Techniques are disclosed for virtual processor overcommit for real time virtualization. A hypervisor may schedule virtual processors on physical processors. The hypervisor may schedule the virtual processor out, for example, after it completes tasks and then may schedule a different virtual processor to complete additional tasks. When setting up a system for real time virtualization, real time virtual processors often run on their own exclusive physical processors in order to ensure immediate (i.e., real time) response times. However, virtual machines also have housekeeping virtual processors, which are used for maintenance or non-real time workloads. Generally, virtualization systems have a dedicated physical processor assigned to running a specific housekeeping virtual processor. For example, each virtual processor may be assigned to an exclusive physical processor. These housekeeping virtual processors can take or acquire locks on shared resources, which in turn, may block the real time virtual processors running on other physical processors from performing tasks that require access to resources protected by the respective locks. For example, a housekeeping virtual processor may hold a lock for a long period of time, which may exceed the maximum response time for the real time workload in question. Delaying and/or blocking the real time virtual processors from completing tasks wastes system resources and slows down real time data processing even though the real time virtual processors are not dependent on the housekeeping virtual processor (e.g., non real time virtual processor) to provide any real time services for the real time virtual processor. Specifically, a real time virtual processor may only depend on asynchronous background services that are provided by the housekeeping virtual processor at non-critical time intervals.

To reduce and potentially eliminate delays or instances where the real time virtual processor is blocked by a housekeeping virtual processor, the techniques disclosed advantageously enables multiple housekeeping virtual processors to share the same physical processors. Additionally, the techniques disclosed herein enable housekeeping virtual processors to complete critical sections of work and then yield the physical processor (e.g., CPU) to other processes. For example, multiple housekeeping virtual processors may share the same physical processors with each other and with other tasks running in the hypervisor by allowing a housekeeping virtual processor of a real time virtual machine to run critical tasks (e.g., critical sections of code) to completion before being scheduled out by the hypervisor. If a housekeeping virtual processor is scheduled out before completing a task (e.g., the virtual processor is preempted by the hypervisor), the virtual processor may have to be rescheduled at a later time to complete the task. For example, the hypervisor may preempt a virtual processor (e.g., cause another task to execute or run a different virtual processor on the physical processor) that is holding a lock or using a resource so that another virtual processor can access or use the physical resource.

Existing solutions typically focus on improving throughput on a system, and not at minimizing latency for real time virtual processors on dedicated physical processors. For example, throughput may be improved by having virtual processors waiting for spinlocks to yield the physical processor to other virtual processors. However, the latency associated with yielding the physical processor each time a virtual processor is waiting for a spinlock would typically be unacceptable for real time virtual processors. For example, yielding the physical processor to a different virtual processor or process may add additional latency to the system, especially in instances where the wait time for a spinlock is relatively small compared to the time to yield the physical processor to another virtual processor or process. Another proposed solution involves not preempting a guest while the guest is in a critical section. However, this solution assumes a critical section is not immediately followed by another critical section, which is common in places where the real time kernel has broken up a large critical section into many smaller critical sections, which would in turn lead to latency issues. Another proposed solution involves a guest checking the amount of remaining timeslice before taking a spinlock. However, checking timeslice before taking a spinlock may be unable to handle nested spinlocks or unexpected interruptions in the hypervisor. Additionally, timeslice is related to several different tasks sharing a processor, which is generally not applicable to real time virtual processors. Thus, each of the above proposed solutions are not suitable for real time virtual processors and would likely fail if implemented in a system using real time virtual processors, as they would involve unacceptable latency for real time tasks.

As described in the various example embodiments disclosed herein, to minimize latency in real time data processing and consolidate virtual processors on fewer physical processors, a virtual processor such as a real time virtual processor increments a per-processor counter each time the housekeeping virtual processor takes a lock (e.g., spinlock) indicating that the virtual processor is in a non-preemptible critical section. Upon releasing the lock, the virtual processor decrements the per-processor counter. Once the counter reaches its initial value, the virtual processor checks a flag set by the hypervisor, which indicates whether the virtual processor should yield its respective physical processor to another process. If the flag is set (e.g., indicating that the virtual processor should yield the physical processor), the virtual processor makes a hypercall to the hypervisor to yield the physical processor to another process. By keeping a count to indicate that the virtual processor is in a critical section and yielding the physical processor after the critical section is completed, virtual processors, such as housekeeping virtual processors advantageously complete critical work sections before being scheduled out by the hypervisor, thereby reducing latency and the amount of instances the housekeeping virtual processor delays and blocks real time virtual processors. For example, without such a safeguard in place, a housekeeping virtual processor may acquire a lock and block a real time virtual processor from completing tasks associated with resources protected by the lock. For example, in some instances, the housekeeping virtual processor may hold the lock for an extended period of time (e.g., beyond the non-critical section of work) thereby blocking the real time virtual processor. In some instances, the housekeeping virtual process may be scheduled out before completing, which results in delayed real time processes without completing the housekeeping tasks. If a housekeeping task is stopped and the virtual machine is scheduled out before completion (e.g., the virtual machine is preempted by the hypervisor), the housekeeping task may need to be executed again, which may cause future delays. By allowing the housekeeping task (e.g., critical section tasks) to run to completion, there may be a single delay instead of multiple delays and multiple hypervisor preemptions associated with the same task.

At various times (e.g., at VMEXIT), the hypervisor may check whether the per-processor counter is at a non-initial value (e.g., non-zero). If the counter is at a non-initial value, the hypervisor may set a flag indicating that the guest should yield the physical processor on unlock. For example, the hypervisor may set the flag instead of scheduling out the guest or running something else on the host, which may end up causing further delays in the future. Then, the hypervisor may resume guest execution with an instruction (e.g., VMENTER) so that the guest may complete critical sections of work. In some examples, a flag may be set if the host needs to schedule a different task in order to get the work done. For example, the physical processor may yield on unlock to other tasks or processes, for example, from other virtual processors. Alternatively, a flag may not be set if the work is handled immediately, for example, in a hard irq context between the VMEXIT and the VMENTER. In another example, a flag may be set if there is another maintenance task to be performed. Thus, the other maintenance task can be completed immediately after the lock is released.

FIG. 1A depicts a high-level component diagram of an example computing system 100A in accordance with one or more aspects of the present disclosure. The computing system 100 may include an operating system (e.g., host OS 186), one or more virtual machines (VM 170A-C), nodes (e.g., nodes 110A-C), and counters 175A-E.

Virtual machines 170A-C may include a guest OS, guest memory, real time virtual CPUs (RVCPUs) and/or housekeeping virtual CPUs (HVCPUs), virtual memory devices (VMD), and virtual input/output devices (VI/O). For example, virtual machine 170A may include guest OS 196A, a housekeeping virtual CPU 190A, a virtual memory devices 192A, and virtual input/output device 194A. Similarly, virtual machine 170B may include guest OS 196B, housekeeping virtual CPUs 190B-C, a virtual memory device 192B, and virtual input/output device 194B. Virtual machine 170C may include guest OS 196C, real time virtual CPU 191A, housekeeping virtual CPU 190D, a virtual memory device 192C, and virtual input/output device 194C.

The computing system 100A may also include a hypervisor 180 and host memory 184. Hypervisor 180 may manage host memory 184 for the host operating system 186 as well as memory allocated to the virtual machines 170A-C and guest operating systems 196A-C such as guest memory or virtual machine memory provided to guest OS 196A-C. Host memory 184 and virtual machine memory may be divided into a plurality of memory pages that are managed by the hypervisor 180. Virtual machine memory allocated to the guest OS 196A-B may be mapped from host memory 184 such that when a guest application 198A-E uses or accesses a memory page of virtual machine memory, the guest application 198A-E is actually using or accessing host memory 184.

In an example, a virtual machine 170A may execute a guest operating system 196A and run applications 198A-B which may utilize the underlying VCPU 190A, VMD 192A, and VI/O device 194A. One or more applications 198A-B may be running on a virtual machine 170A under the respective guest operating system 196A. A virtual machine (e.g., VM 170A-B, as illustrated in FIG. 1) may run on any type of dependent, independent, compatible, and/or incompatible applications on the underlying hardware and OS. In an example, applications (e.g., App 198A-B) run on a virtual machine 170A may be dependent on the underlying hardware and/or OS 186. In another example embodiment, applications 198A-B run on a virtual machine 170A may be independent of the underlying hardware and/or OS 186. For example, applications 198A-B run on a first virtual machine 170A may be dependent on the underlying hardware and/or OS 186 while applications (e.g., application 198C-D) run on a second virtual machine (e.g., VM 170B) are independent of the underlying hardware and/or OS 186A. Additionally, applications 198A-B run on a virtual machine 170A may be compatible with the underlying hardware and/or OS 186. In an example embodiment, applications 198A-B run on a virtual machine 170A may be incompatible with the underlying hardware and/or OS 186. For example, applications 198A-B run on one virtual machine 170A may be compatible with the underlying hardware and/or OS 186A while applications 198C-D run on another virtual machine 170B are incompatible with the underlying hardware and/or OS 186. In an example embodiment, a device may be implemented as a virtual machine (e.g., virtual machine 170A-B).

The computer system 100A may include one or more nodes 110A-C. Each node 110A-B may in turn include one or more physical processors (e.g., CPU 120A-E) communicatively coupled to memory devices (e.g., MD 130A-D) and input/output devices (e.g., I/O 140A-C). Each node 110A-C may be a computer, such as a physical machine and may include a device, such as hardware device. In an example, a hardware device may include a network device (e.g., a network adapter or any other component that connects a computer to a computer network), a peripheral component interconnect (PCI) device, storage devices, disk drives, sound or video adaptors, photo/video cameras, printer devices, keyboards, displays, etc. Virtual machines 170A-C may be provisioned on the same host or node (e.g., node 110A) or different nodes. For example, VM 170A and VM 170B may both be provisioned on node 110A. Alternatively, VM 170A may be provided on node 110A while VM 170B is provisioned on node 110B.

In an example, housekeeping virtual processors 190A-D and real time virtual processor 191A may each be associated with its own respective physical processor (e.g., physical CPUs 120A-E of nodes 110A-C). In another example, virtual processors may be assigned to the same physical processor or CPU. Additionally, virtual processors may be assigned to different cores on the same physical processor. In an example, virtual machines (e.g., VM 170A-B) may be housekeeping virtual machines dedicated to performing maintenance or housekeeping tasks. Additionally, a virtual machine (e.g., VM 170C) may be a real time virtual machine dedicated to perform real time tasks. In an example, a real time virtual machine (e.g., VM 170C) may include both real time virtual processors (e.g., RVCPU 191A) and housekeeping virtual processors (e.g., HVCPU 190D). In an example, a real time processor may be a graphics processing unit (GPU).

Figure 1B:
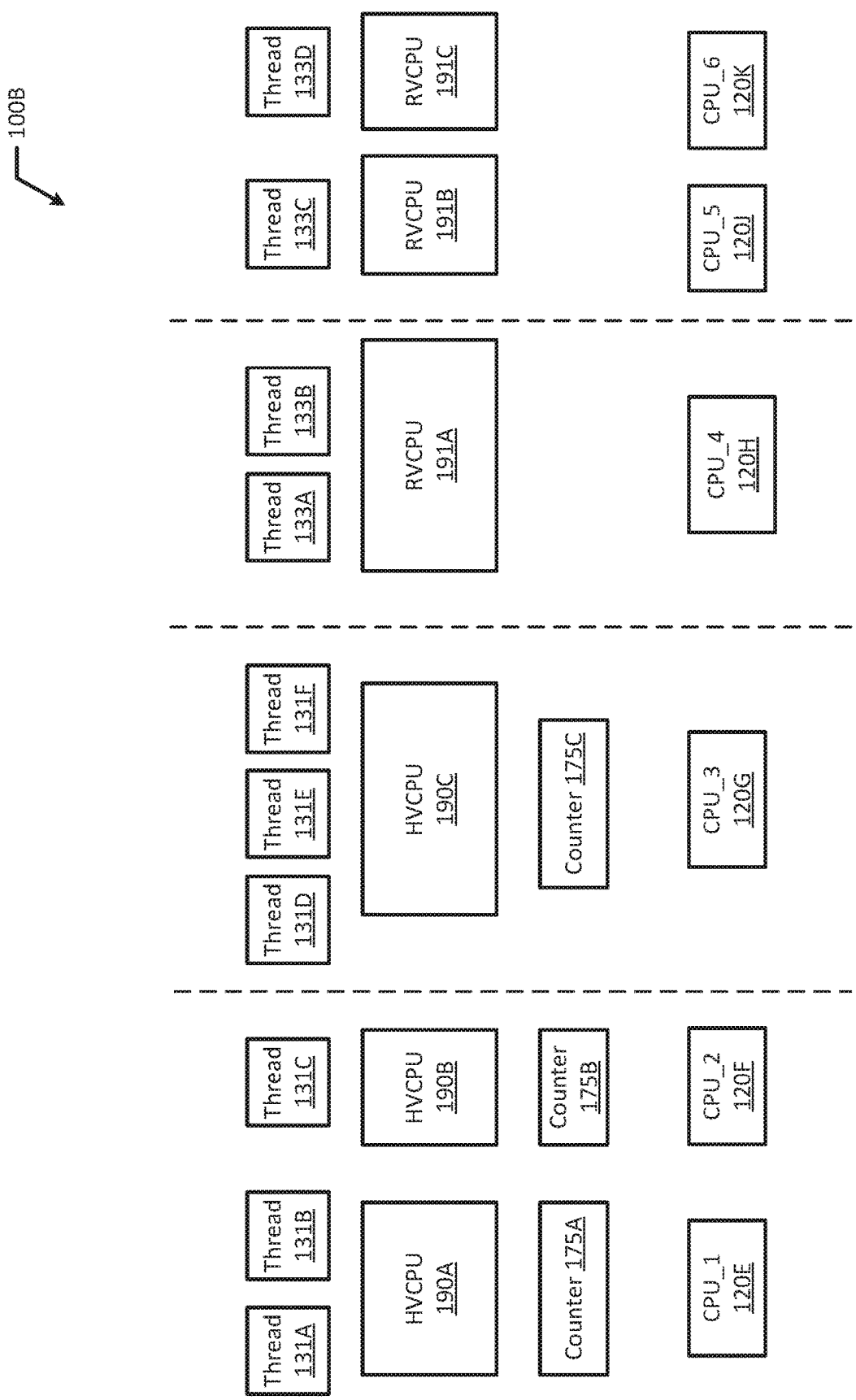

As illustrated in computer system 100B of FIG. 1B, each virtual processor may be assigned a physical processor. For example, housekeeping virtual CPU 190A may be assigned physical processor 120E (e.g., CPU_1). Similarly, housekeeping virtual CPU ("HVCPU") 190B may be assigned physical processor 120F (e.g., CPU_2). CPU_1 and CPU_2 may both be hardware components on the same node or machine. In an example, CPU_1 and CPU_2 may be different cores of the same physical processor. Additionally, each HVCPU 190A-B may be associated with a respective counter 175A-B. HVCPU 190C may be assigned to physical processor 120G (e.g., CPU_3) and have a designated counter 175C. Additionally, real time virtual CPU ("RVCPU") 191A may be assigned physical processor 120H (e.g., CPU_4). Similarly, RVCPUs 191B-D may be assigned physical processor 120J (e.g., CPU_5) and physical processor 120K (e.g., CPU_6), respectively.

As illustrated in FIG. 1B, each virtual processor 190A-C and 191A-C may run one or more threads 131A-F and 133A-D. For example, HVCPU 190A may run threads 131A-B, HVCPU 190B may run thread 131C, HVCPU 190C may run threads 131D-F, RVCPU 191A may run threads 133A-B, RVCPU 191B may run thread 133C, and RVCPU 191C may run thread 133D. A thread or ordered sequence of instructions may allow the virtual processors to execute multiple instruction streams simultaneously. For example, HVCPU 190C may simultaneously run three instruction streams on threads 131D-F.

Additionally, each housekeeping virtual processor or HVCPU may be associated with a counter (e.g., counter 175A-C as illustrated in FIG. 1B). For example, counters maybe incremented, decremented, and checked by housekeeping processors to track which housekeeping virtual processors are in a critical section. In another example, each virtual processor (e.g., HVCPU and RVCPU) may be associated with a counter (e.g., a per-CPU counter 175A-E as illustrated in FIG. 1A). For example, counters 175A-E, hereinafter generally referred to as counters 175, may be incremented, decremented, and checked unconditionally on all virtual processors. Additionally, counters 175 may be used to track when a virtual processor (e.g., HVCPU 190 or RVCPU 191) takes or acquires a lock. In another example, counters 175 may be used to track when a virtual processor (e.g., HVCPU 190 or RVCPU 191) performs a non-preemptible task or enters a non-preemptible section of code that would exclude other virtual processors (e.g., HVCPU 190 or RVCPU 191) from executing a task or accessing a data structure.

Real time processors, for example, real time virtual processors 191A-C, handle real time data processing that involves continual input, process and output of data, which is processed in small time periods or near real time. Some examples of real time data processing includes customer services, bank ATMs, video processing and streaming, graphics processing, etc. For example, while some data processing may be handled in batches (e.g., batch data processing or non-real time data processing), real time data processing has the ability to take immediate action for tasks where real time or near real time completion is important. For example, real time processors may be used to optimize customer experiences by providing immediate or nearly immediate processing. In a Point of Sale context, real time processors may be used to update inventory and run payments in real time.

Housekeeping processors, for example, housekeeping virtual processors 190A-D, handle housekeeping tasks such as maintenance or clean up tasks. For example, housekeeping tasks may include removing or archiving logs that a system has made as a result of user activities, deletion of temporary files which may otherwise simply take up space, etc. In an example, housekeeping processors may participate in non real time data processing, such as batch data processing to perform necessary chores such that a computer system is capable of performing its normal activity, but that are not necessarily part of the real time data processing. Additional housekeeping activities may include cleaning up computer disk storage such as data compression or defragmentation to improve disk performance.

As used herein, physical processor or processor 120A-C, refers to a device capable of executing instructions encoding arithmetic, logical, and/or I/O operations. In one illustrative example, a processor may follow Von Neumann architectural model and may include an arithmetic logic unit (ALU), a control unit, and a plurality of registers. In a further aspect, a processor may be a single core processor which is typically capable of executing one instruction at a time (or process a single pipeline of instructions), or a multi-core processor which may simultaneously execute multiple instructions. In another aspect, a processor may be implemented as a single integrated circuit, two or more integrated circuits, or may be a component of a multi-chip module (e.g., in which individual microprocessor dies are included in a single integrated circuit package and hence share a single socket). A processor may also be referred to as a central processing unit (CPU).

As discussed herein, a memory device 130A-C refers to a volatile or non-volatile memory device, such as RAM, ROM, EEPROM, or any other device capable of storing data. As discussed herein, I/O device 140A-C refers to a device capable of providing an interface between one or more processor pins and an external device capable of inputting and/or outputting binary data.

Processors 120A-C may be interconnected using a variety of techniques, ranging from a point-to-point processor interconnect, to a system area network, such as an Ethernet-based network. Local connections within each node, including the connections between a processor 120A-C and a memory device 130A-C may be provided by one or more local buses of suitable architecture, for example, peripheral component interconnect (PCI).

Figure 2:
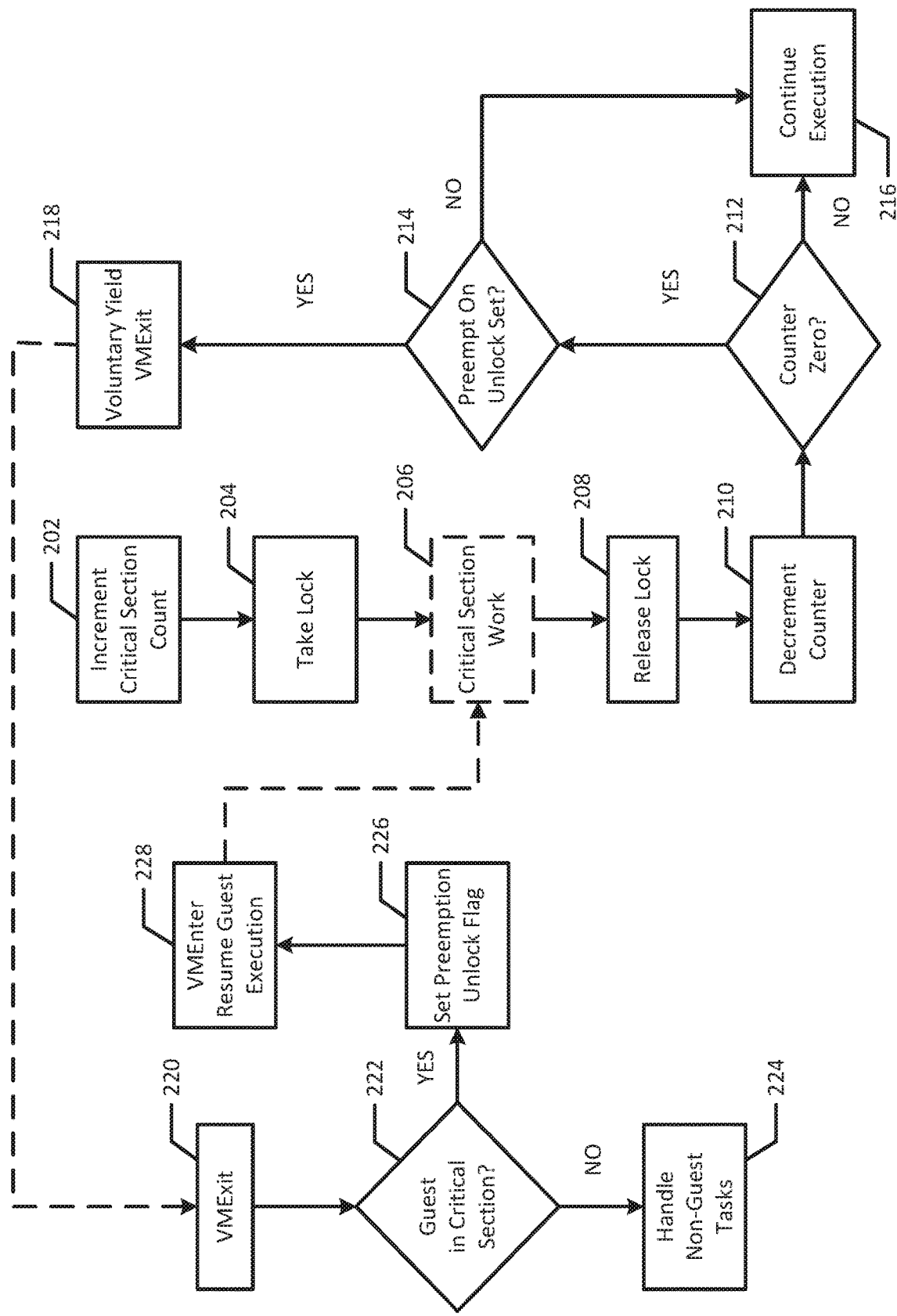
FIG. 2 illustrates a flowchart of an example process for housekeeping virtual processor overcommit for real time virtualization according to an example embodiment of the present disclosure.

FIG. 2 illustrates a flowchart for housekeeping virtual processor overcommit for real time virtualization. As illustrated in FIG. 2, a virtual processor, such as a housekeeping virtual processor 190 may increment a critical section count on a counter 175 before taking a lock (block 202). For example, a lock may need to be acquired before accessing data protected by the lock to ensure that the correct data is obtained. Other locks, such as a spinlock may cause a processor thread (e.g., thread 131) trying to acquire the lock to wait in a loop (e.g., spin) while repeatedly checking if the lock is available. Then, the virtual processor 190 may take the lock (block 204) and perform critical section work (block 206). Typically, critical section work may take as little as a microsecond to perform up to tens of microseconds. In another example, critical section work may take one hundred microseconds or more. After performing the critical section work, the virtual processor 190 may release the lock (block 208) and decrement the critical section count on the counter 175 (block 210). Then, the virtual processor 190 may determine whether the counter value is zero (block 212). If the counter 175 does not reach an initial value (e.g., zero) after decrementing the counter 175, then the virtual processor 190 may continue execution (block 216). For example, if the counter 175 is non-zero (e.g., one), the virtual processor 190 may initiate and/or perform additional critical section work. If the counter value is back to the initial value (e.g., zero), then the virtual processor 190 may check whether preempt on unlock is set for the virtual processor 190 (block 214), for example, via a flag.

If preempt on unlock is not set, then the virtual processor 190 may continue execution, even if the execution is for non-critical section work. However, if preempt on unlock is set, then the virtual processor 190 may voluntarily yield and the associated virtual machine 170 may exit (block 218). When the VM 170 exits (e.g., at VMExit) (block 220), a hypervisor 180 may determine if a guest (e.g., guest OS 196) is in a critical work section (block 222). If the guest (e.g., guest OS 196) is not in a critical section, the hypervisor 180 may handle non-guests tasks (block 224), such as system tasks. If the guest (e.g., guest OS 196) is in a critical section, then the hypervisor 180 may set a preemption unlock flag for the virtual processor (block 226). Then, the hypervisor 180 may resume guest execution (e.g., via VMEnter) (block 228). Then, the guest (e.g., guest OS 196) and its associated virtual processor 190 may continue its critical section work until completion. By allowing the guest to continue critical section work until completion, the critical work is completed before the virtual processor 190 is scheduled out and yielded to other tasks or processes. For example, the physical processor 120 may be yielded to other housekeeping tasks from other housekeeping virtual machines and housekeeping virtual processors, which may use the same physical processor 120, which advantageously allows multiple housekeeping virtual machines and multiple housekeeping virtual processors 190 to use the same physical processor 120 with increased performance and lower latency. Additionally, physical processor 120 utilization is advantageously reduced, thus enabling efficient overcommit of the physical processors 120 of the system, where more virtual machines and more virtual processors (e.g., housekeeping virtual processors 190) can be executed in a given set of physical processors 120, thereby increasing virtual machine density.

An example data structure shared between the guest and host is illustrated below:

```
struct kvm_vcpu_critical_section {
/* This field is incremented at raw_spin_lock time, and decremeented at raw_spin_unlock time. */
_u32 in_critical_section_cnt;
_u32 yield_on_unlock;
};
```

Figure 3:
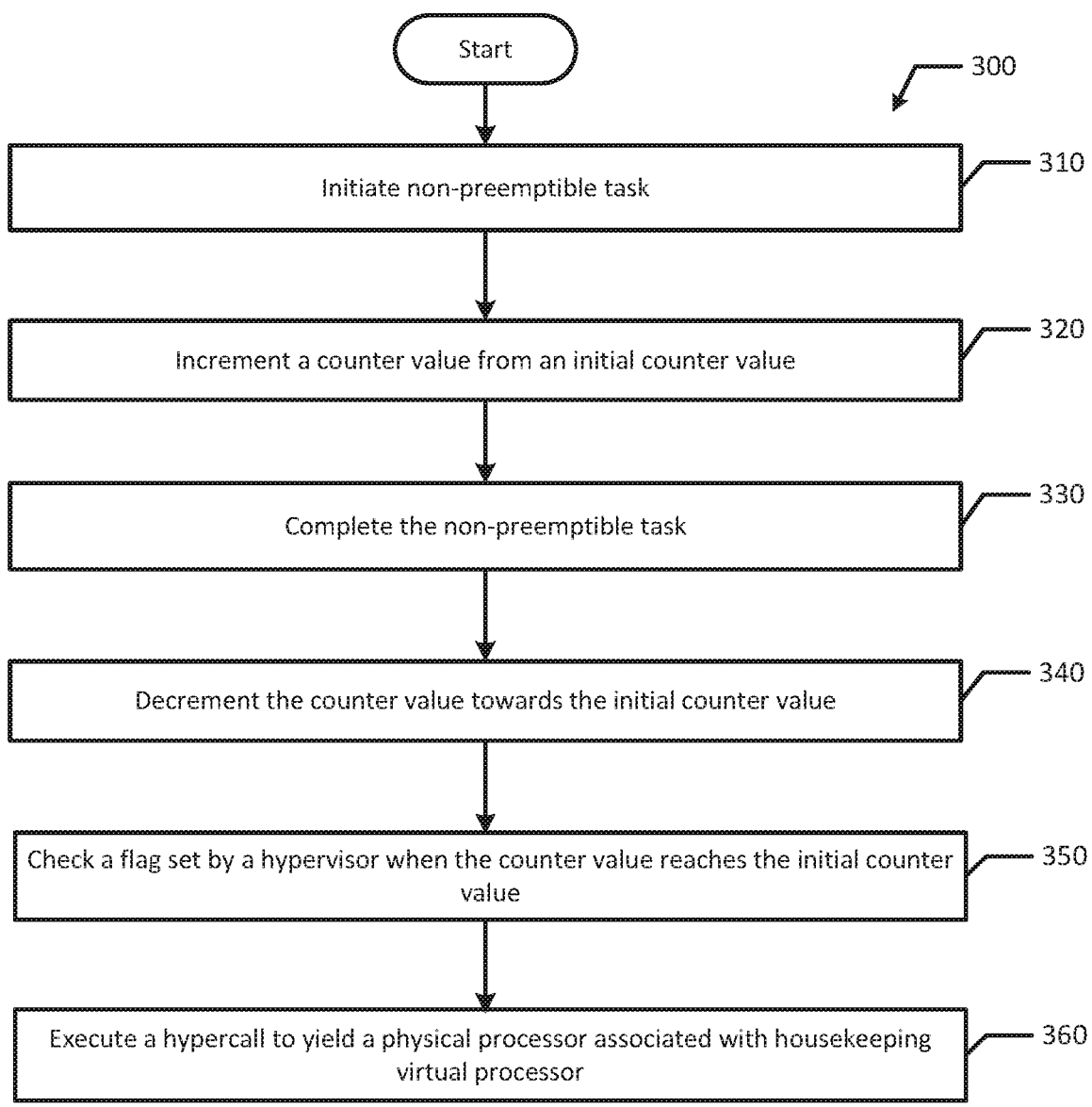
FIG. 3 illustrates a flowchart of an example process for housekeeping virtual processor overcommit for real time virtualization according to an example embodiment of the present disclosure.

FIG. 3 illustrates a flowchart of an example method 300 for housekeeping VCPU overcommit for real time virtualization according to an example embodiment of the present disclosure. Although the example method 300 is described with reference to the flowchart illustrated in FIG. 3, it will be appreciated that many other methods of performing the acts associated with the method 300 may be used. For example, the order of some of the blocks may be changed, certain blocks may be combined with other blocks, and some of the blocks described are optional. The method 300 may be performed by processing logic that may comprise hardware (circuitry, dedicated logic, etc.), software, or a combination of both.

The example method 300 includes initiating a non-preemptible task (block 310). For example, a housekeeping virtual processor 190A may initiate the non-preemptible task. In an example, a non-preemptible task may be protected by a lock and initiating the non-preemptible task may include taking a lock, such as a spinlock. For example, a lock may be used to guarantee non-preemption. In another example, a non-preemptible task may be a section of code. For example, the non-preemptible task may involve an interrupt handler that prevents reading a data structure until writing is complete. Additionally, a sequence log may be used to delay accessing data that is currently being written. Then, the virtual processor increments a counter value from an initial counter value (block 320). For example, responsive to initiating the non-preemptible task, the housekeeping virtual processor 190A may increment a counter value from an initial counter value. The counter value may be incremented before the non-preemptible task is performed. For example, the housekeeping virtual processor 190A may initiate the non-preemptible task after receiving a command or an instruction. In an example, a non-initial counter value indicates that the housekeeping virtual processor is in a non-preemptible critical section. An initial counter value, for example, may be zero ("0") and a counter 175 may be incremented by integer values (e.g., 1, 2, 3) any time a lock is taken or a non-preemptible task is performed. Next, the virtual processor completes the non-preemptible task (block 330). For example, the housekeeping virtual processor 190A may complete the non-preemptible task. In an example, completing the non-preemptible task may include releasing a lock. Then, the virtual processor decrements the counter value towards the initial counter value (block 340). For example, responsive to completing the non-preemptible task, the housekeeping virtual processor 190A may decrement the counter value towards the initial counter value (e.g., zero). For example, if the counter was most recently incremented to one ("1"), then the counter 175 may decrement back to the initial counter value of zero. Then, the virtual processor checks a flag set by a hypervisor when the counter value reaches the initial counter value (block 350). For example, responsive to the counter value reaching the initial counter value, the housekeeping virtual processor 190A may check the flag set by a hypervisor. In an example, the flag may be an integer stored in memory that indicates whether a physical processor should yield to other processes once the housekeeping virtual processor 190A is done with the critical section of work. For example a flag of "1" may be used to indicate that the physical processor (e.g., CPU 120A) should yield, while a value of "0" indicates that the physical processor (e.g., CPU 120A) should not yield. The virtual processor executes a hypercall to yield a physical processor (e.g., CPU 120A) associated with the housekeeping virtual processor (block 360). For example, responsive to checking the flag, the housekeeping virtual processor 190A may execute a hypercall to yield the physical processor (e.g., CPU 120A) associated with the housekeeping virtual processor 190A. A hypercall is a mechanism for a guest or virtual machine to request action or information from the hypervisor. Hypercalls may be simple hypercalls or repeating hypercalls. A simple hypercall is a single call or a request for a single operation by the hypervisor. A repeating hypercall may include a process list of input and/or output elements.

Figure 4:
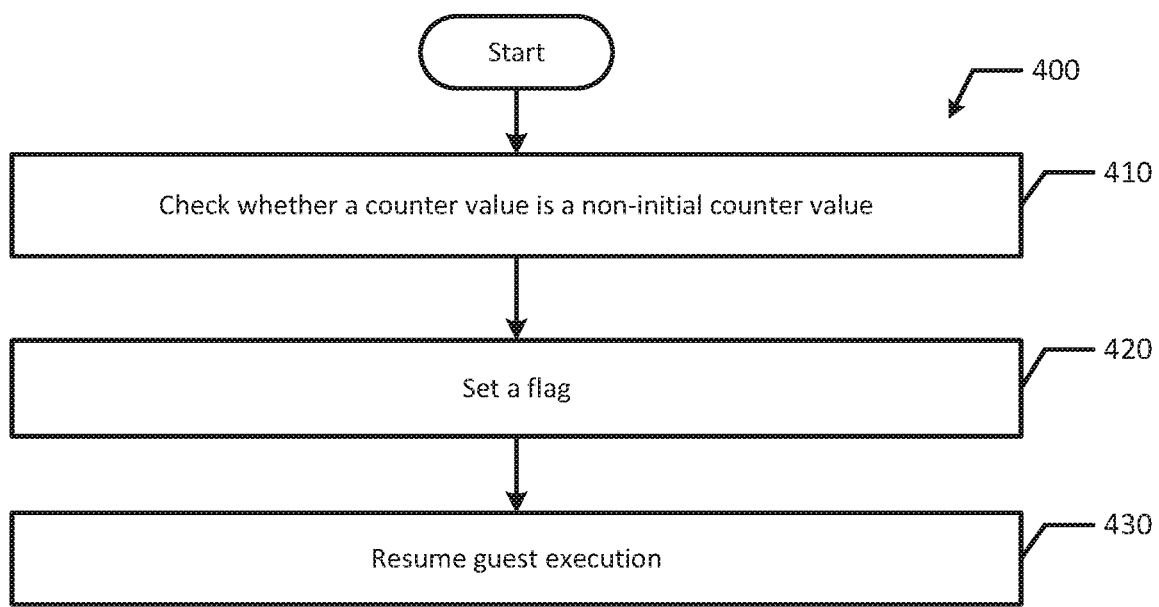
FIG. 4 illustrates a flowchart of an example process for housekeeping virtual processor overcommit for real time virtualization according to an example embodiment of the present disclosure.

FIG. 4 illustrates a flowchart of an example method 400 for housekeeping virtual processor overcommit for real time virtualization according to an example embodiment of the present disclosure. Although the example method 400 is described with reference to the flowchart illustrated in FIG. 4, it will be appreciated that many other methods of performing the acts associated with the method 400 may be used. For example, the order of some of the blocks may be changed, certain blocks may be combined with other blocks, and some of the blocks described are optional. The method 400 may be performed by processing logic that may comprise hardware (circuitry, dedicated logic, etc.), software, or a combination of both.

The example method 400 includes checking whether a counter value is a non-initial counter value (block 410). For example, the hypervisor 180 may check a counter value associated with a VCPU (e.g., RVCPU 191A or HVCPU 190D) is a non-initial counter value. In an example, the counter value is incremented and decremented from an initial value. Additionally, the non-initial counter value may indicate that the VCPU (e.g., RVCPU 191A or HVCPU 190D) is in a non-preemptible critical section of code. Then, the hypervisor may set a flag (block 420). For example, responsive to checking the non-initial counter value, the hypervisor 180 may set a flag. In an example, the flag indicates a request for a guest to yield a physical processor (e.g., CPU 120D-E) running the VCPU (e.g., RVCPU 191A or HVCPU 190D) on unlock. In an example, a flag may be set if the host needs to schedule a different task in order to get a specific portion of work done. Then, the hypervisor may resume guest execution (block 430). For example, the VCPU (e.g., RVCPU 191A or HVCPU 190D) of the guest may continue executing as it was before the hypervisor 180 set the flag.

Figure 5A:
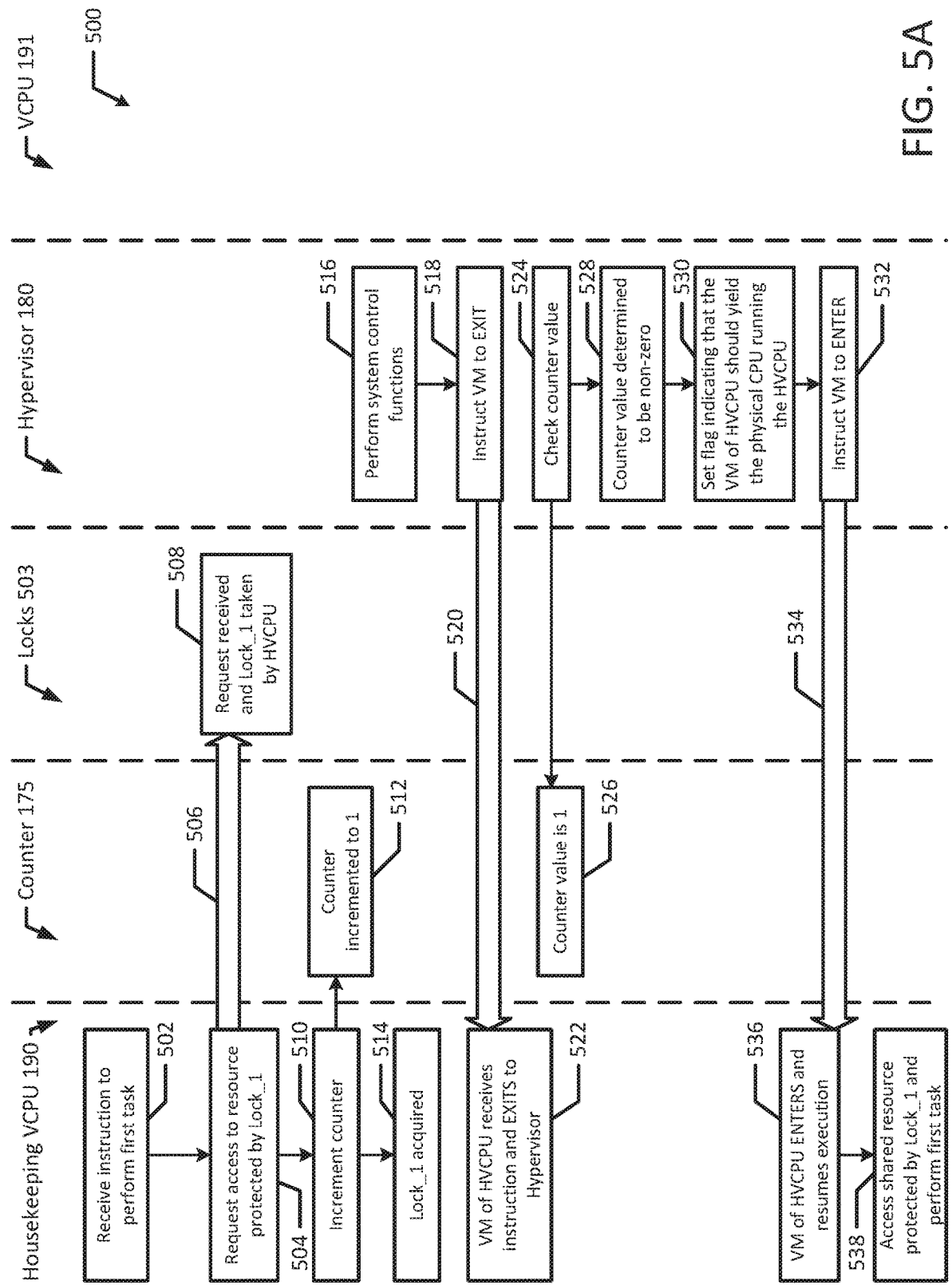
FIGS. 5A and 5B illustrate a flow diagram of an example process for housekeeping virtual processor overcommit for real time virtualization according to an example embodiment of the present disclosure.
Figure 5B:
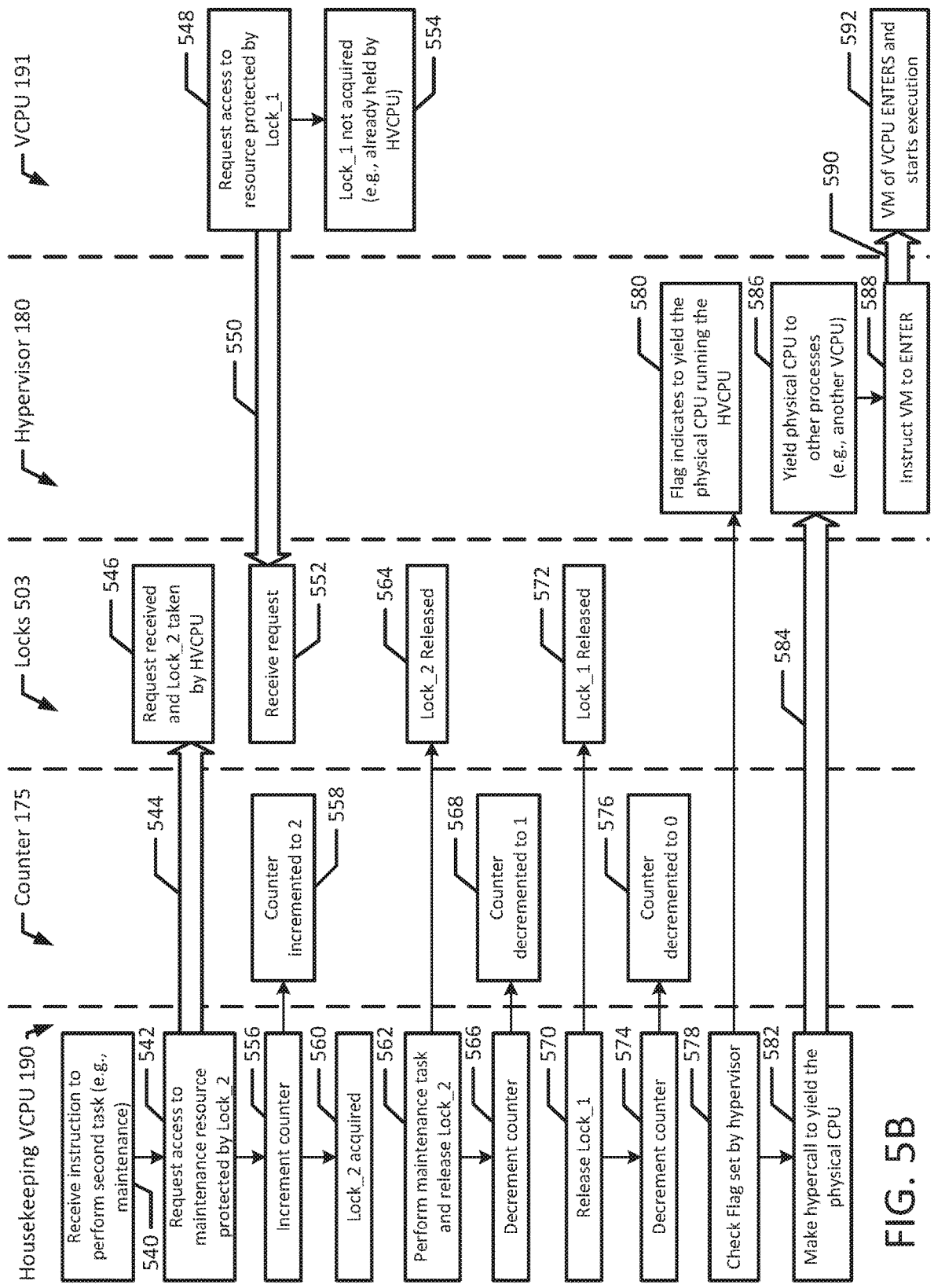

FIGS. 5A and 5B illustrate a flowchart of an example method 500 for housekeeping VCPU overcommit for real time virtualization in accordance with an example embodiment of the present disclosure. Although the example method 500 is described with reference to the flowchart illustrated in FIGS. 5A and 5B, it will be appreciated that many other methods of performing the acts associated with the method 500 may be used. For example, the order of some of the blocks may be changed, certain blocks may be combined with other blocks, and some of the blocks described are optional. For example, a housekeeping VCPU 190, another VCPU (e.g., real time VCPU 191) may acquire various locks 503 and communicate with a hypervisor 180 and counter 175 to perform example method 500.

In the illustrated example, the housekeeping VCPU 190 receives an instruction to perform a first task (block 502). For example, the first task may be a housekeeping task (e.g., configuring network adapters, clean-up, garbage collection). In the illustrated example, the resources (e.g., tables) accessed for the housekeeping task may be protected by a lock. The housekeeping VCPU 190 requests access to the resource protected by Lock_1 (blocks 504 and 506). For example, the housekeeping VCPU 190 may request access to a lock 503, such as Lock_1, which may be a spinlock. In an example, the spinlock may be a raw spinlock, which may be used to reduce memory usage and to improve system performance. Then, the request is received and Lock_1 is taken by the housekeeping VCPU 190 (block 508). For example, if Lock_1 is available (e.g., not held by another processor or process), then Lock_1 may be taken by the housekeeping VCPU 190. The housekeeping VCPU 190 increments a counter 175 (block 510). In an example, the counter 175 may be incremented before acquiring Lock_1. For example, the housekeeping VCPU 190 may increase a counter value from zero ("0") to one ("1") before acquiring the lock 503. In another example, the counter 175 may be incremented after acquiring Lock_1. In an example, the counter value may start at an initial value, such as ("0") and may be incremented away from the initial value to indicate that the housekeeping VCPU 190 is performing a non-preemptible task. Then, the counter 175 is incremented to one ("1") (block 512). In an example, a counter 175 may be incremented by integer values. Additionally, various initial values and increments/decrements may be used.

Then, Lock_1 is acquired by the housekeeping VCPU 190 (block 514). In an example, the lock 503 may ensure that only one process (e.g., process currently holding the lock 503) is accessing the protected resource at a time to prevent other processors or processes from obtaining information from or editing the protected resource before it is updated or from accessing the protected resource while it is being modified, thereby resulting in a dirty read.

In the illustrated example, a hypervisor 180 performs system control functions (block 516). For example, the hypervisor 180 may perform tasks to control the hardware and to manage guest operating systems. Then, the hypervisor 180 instructs the virtual machine associated with housekeeping VCPU 190 (e.g., VM 170) to exit (blocks 518 and 520). For example, the hypervisor 180 may instruct VM 170 to exit at which point a transition is made between VM 170, which is currently running and the hypervisor 180. In an example, hypervisor 180 may save a snapshot of a state of VM 170 as it was running at the time of exit. Then, VM 170 associated with housekeeping VCPU 190 receives an instruction and exits to the hypervisor 180 (block 522). In an example, the VM 170 may receive the instruction. Additionally, the VM 170 may exit to the hypervisor 180 by using a hypercall. In another example, the hypervisor 180 may instruct a particular VCPU (e.g., VCPU 190) of VM 170 to exit. For example, VCPU 190 may exit after receiving the instruction by the hypervisor 180.

After VM 170 exits, the hypervisor 180 checks the counter value (block 524). For example, the hypervisor 180 may check the counter value to determine whether VM 170 or housekeeping VCPU 190 is in a critical section of work. In an example, a non-critical section of work may include tasks that involve locks 503 on shared resources, which might block real time VCPUs 191 from performing tasks. In some instances, a housekeeping VCPU 190 may be scheduled out by the hypervisor 180 before completing a critical section of work, which may result in the locks being held for too long and thus exceeding the maximum response time for the real time workload in question. In the illustrated example, the counter value is ("1") (block 526). For example, the counter value was incremented from an initial value of "0" to "1" by the housekeeping VCPU 190 after acquiring Lock_1. In an example, other increments may be used. Then, the hypervisor 180 determines that the counter value is non-zero (block 528). For example, the hypervisor 180 may determine whether the counter value exceeds its initial value. Then, the hypervisor 180 sets a flag indicating that VM 170 of housekeeping VCPU 190 should yield the physical CPU running the housekeeping VCPU 190 (block 530). For example, the hypervisor 180 may set a flag indicating that housekeeping VCPU 190 is to continue performing critical tasks (e.g., tasks associated with locks 503) until completion, and then upon completing those critical tasks, the CPU should yield to other processes upon unlock (e.g., housekeeping VCPU 190 releasing all respective critical locks 503). The flag indicates what the virtual CPU should do or try to do, however in some cases the virtual processor (e.g., housekeeping VCPU 190) may not be able to yield the physical CPU 120. For example, the housekeeping VCPU 190 may be performing a task and yielding the physical CPU 120 to another VCPU may cause the housekeeping VCPU 190 to crash. Additionally, the housekeeping VCPU may avoid yielding the physical CPU 120 to another process or VCPU because there it has a higher priority task or instruction. In another example, the physical processor 120 may not be able to yield to another virtual processor because the physical CPU may not have the capacity to run the other virtual processor.

After setting the flag, hypervisor 180 instructs VM 170 to enter (blocks 532 and 534). For example, hypervisor 180 may send an instruction to VM 170 indicating to transition between hypervisor 180, which is currently running and performing system tasks, and VM 170. In an example, the instruction may indicate the state that VM 170 should enter at (e.g., the state VM 170 was running at the time of exit). In another example, hypervisor 180 may instruct another VCPU of VM 170 to enter.

Then, VM 170 with housekeeping VCPU 190 enters and resumes execution (block 536). For example, VM 170 may enter and resume execution at its previous state. Then, the housekeeping VCPU accesses the shared resource protected by Lock_1 and performs the first task (block 538). For example, the housekeeping VCPU may perform the first task (e.g., housekeeping task) by resetting rows in the tables protected by Lock_1. In an example, the housekeeping VCPU may clean up data that is logically deleted by resetting rows so the tables have space again.

Housekeeping VCPU 190 receives an instruction to perform a second task (block 540). For example, the housekeeping VCPU 190 may receive an instruction from VM 170 to perform a second task, such as a maintenance task. In an example, the maintenance task may include writing dirty buffers to a disk to improve CPU utilization and decrease the need for buffer washing during transaction processing. In the illustrated example, the resources (e.g., disk) accessed for maintenance may be protected by a lock. The housekeeping VCPU 190 requests access to the resource protected by Lock_2 (blocks 542 and 544). For example, the housekeeping VCPU 190 may request access to a lock 503, such as Lock_2, which may be a spinlock. Then, the request is received and Lock_2 is taken by the housekeeping VCPU 190 (block 546). For example, if Lock_2 is available (e.g., not held by another processor or process), then Lock_2 may be taken by the housekeeping VCPU 190.

Other virtual processors may attempt to access protected resources. In the illustrated example, VCPU 191 requests access to the resource protected by Lock_1 (blocks 548 and 550). For example, VCPU 191 may attempt to access the protected resource or attempt to grab Lock_1. Then, the request is received (block 552). However, Lock_1 is not acquired by VCPU 191 (block 554). For example, Lock_1 is currently held by housekeeping VCPU 190, and thus VCPU 191 is blocked from accessing the protected resources (e.g., tables).

Before acquiring Lock_2, the housekeeping VCPU 190 increments the counter 175 (block 556). In an example, the housekeeping VCPU 190 may increment the counter 175 after acquiring the lock. For example, the housekeeping VCPU 190 may increase the counter value from one ("1") to two ("2") after acquiring the second lock 503. In an example, a non-zero counter value may indicate that the housekeeping VCPU 190 is performing a non-preemptible task. Then, the counter 175 is incremented to two ("2") (block 558). For example, the counter 175 may be incremented by another integer value of 1 to increase the counter value from "1" to "2", which indicates that the housekeeping VCPU is currently holding two locks. Then, Lock_2 is acquired by the housekeeping VCPU 190 (block 560). In an example, the lock 503 may ensure that only one process (e.g., the process currently holding the lock) is accessing the protected resource at a time to prevent other processors or processes from obtaining information from or editing the protected resource.

After the housekeeping VCPU 190 accesses the shared resource protected by Lock_2 and performs the second task, the housekeeping VCPU releases Lock_2 (block 562). For example, the housekeeping VCPU may perform the maintenance tasks on the disks protected by Lock_2. In an example, the housekeeping VCPU may write dirty buffers to the disks. Then, Lock_2 is released (block 564). For example, the lock may be released and made available to other virtual processors and processes. After releasing Lock_2, housekeeping VCPU 190 decrements the counter 175 (block 566). For example, housekeeping VCPU 190 decrements counter 175 to a counter value of one ("1"). In an example, after releasing a lock, the housekeeping VCPU 190 decrements a counter from its current value (e.g., two) back towards its initial value (e.g., zero). Then, the counter 175 is decremented to one ("1") (block 568). In an example, the counter may be decremented before releasing the lock. For example, the lock 503 may be released after the counter 175 is decremented.

Then, after completing work associated with the tables protected by Lock_1, the housekeeping VCPU 190 releases Lock_1 (block 570). Then, Lock_1 is released (block 572). For example, the lock may be released and made available to other virtual processors and processes. After releasing Lock_1, housekeeping VCPU 190 decrements the counter 175 (block 574). For example, housekeeping VCPU 190 decrements counter 175 to the counter value of zero ("0"). In an example, after releasing the lock 503, the housekeeping VCPU 190 decrements the counter 175 from its current value (e.g., one) back towards its initial value (e.g., zero). Then, the counter 175 is decremented to zero ("0") (block 576). For example, the counter 175 is decremented back to its initial value. In an example, an initial value other than zero ("0") may be used. Additionally, the counter 175 may be decremented to indicate that a lock 503 has been taken and incremented to indicate that a lock 503 has been released. For example, the initial value may be three ("3") and when a lock is taken, the counter may be decremented from three ("3") to two ("2"). When the lock is released, the counter 175 may be incremented from its current counter value of two ("2") back towards the initial counter value of ("3"). Also, any incremental change from an initial starting value, such as 0 or 3, may be incrementing, while heading back towards the starting value may be decrementing, as referred to herein, such that a counter counting in reverse may be implemented with the system. In another example, the initial counter value may indicate the maximum number of locks the virtual processor is allowed to acquire at a given time. For example, an initial counter value of three ("3" or boolean 11) may indicate that the virtual processor is allowed to hold a maximum of four locks at a time, since it may progressively count from 3 (boolean 11), to 2 (boolean 10), to 1 (boolean 01), to 0 (boolean 00), and the counter cannot count below zero so at 0 (00), no more locks may be taken at that point until at least one lock is removed.

After decrementing the counter 175, the housekeeping VCPU 190 checks the flag set by the hypervisor 180 (block 578). In the illustrated example, the flag indicates to yield the physical CPU 120 running the housekeeping VCPU 190 (block 580). For example, the flag may be set to indicate to yield the physical CPU 120 for other tasks (e.g., for different tasks in a work order). The flag ensures that the physical CPU 120 is yielded, but not until after the critical work is completed, which prevents the hypervisor 180 from pre-empting until after critical section is completed. Then, the housekeeping VCPU 190 makes a hypercall to yield the physical CPU 120 (blocks 582 and 584). For example, the housekeeping VCPU 190 or VM 170 may make a hypercall to the hypervisor 180, thereby requesting action by the hypervisor 180. In this case, the housekeeping VCPU 190 or VM 170 is requesting the hypervisor 180 to yield the physical CPU 120 to another process. Then, the hypervisor 180 yields the physical CPU 120 to other processes (block 586). For example, the hypervisor 180 may yield the physical CPU 120 to another VCPU 191, such as another housekeeping VCPU 190. Then, the hypervisor 180 instructs a VM 170 associated with another VCPU 191 to enter (blocks 588 and 590). For example, the hypervisor 180 may instruct the VM 170 to enter via a VMENTER command or instruction. Then, the VM 170 of VCPU 191 enters and starts execution (block 592). For example, the physical CPU 120 is yielded to another task, which advantageously allows the physical CPU 120 to be shared by multiple virtual processors. Additionally, keeping a count to indicate that the virtual processor is in a critical section and yielding the physical CPU 120 after critical work is completed advantageously reduces delays and down time resulting from preempting or scheduling out virtual machines 170 before critical work is completed.

Figure 6:
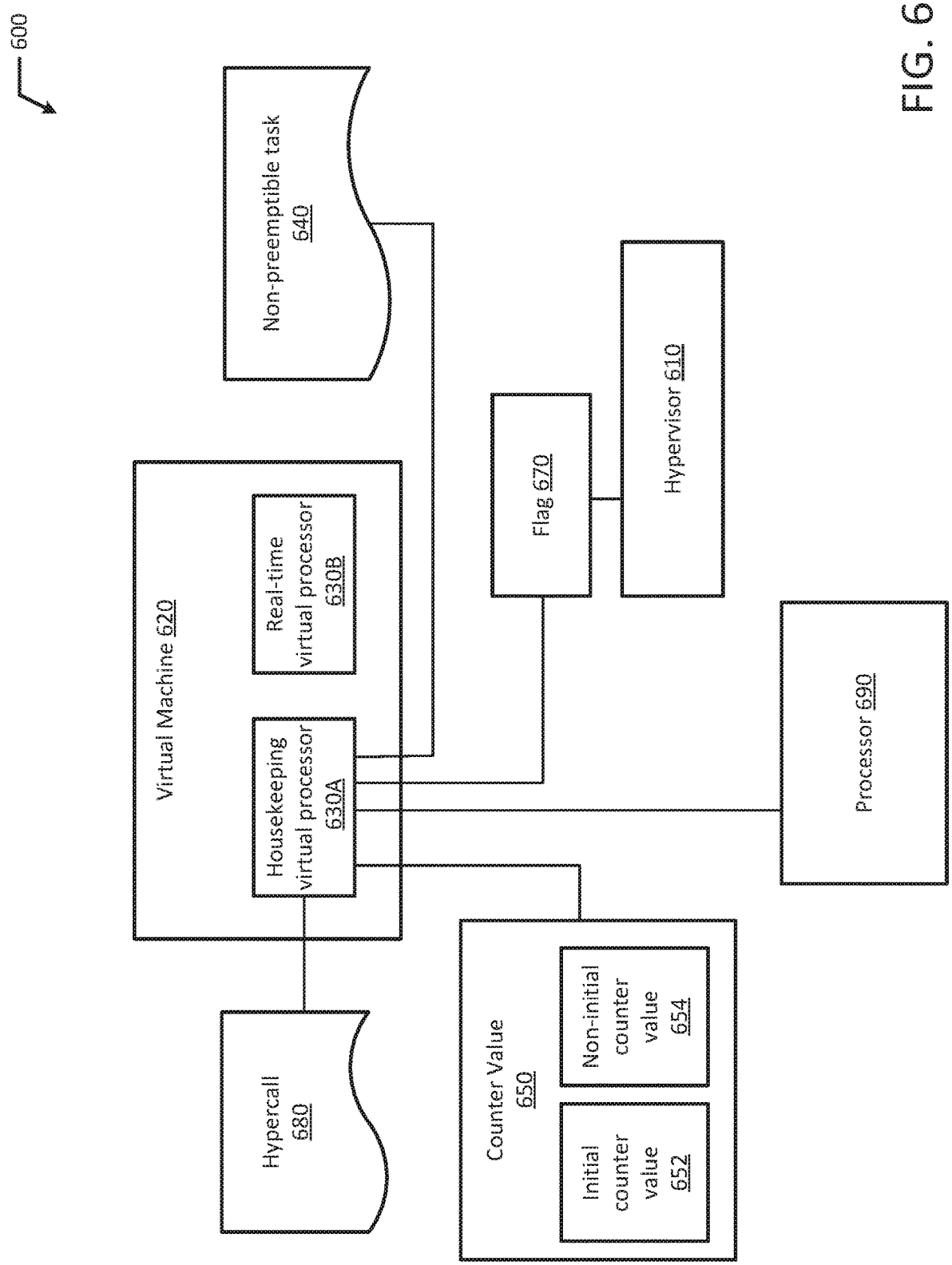
FIG. 6 illustrates a block diagram of an example housekeeping virtual processor overcommit system according to an example embodiment of the present disclosure.

FIG. 6 is a block diagram of an example housekeeping virtual processor overcommit system 600 according to an example embodiment of the present disclosure. The reverse order submission system 600 includes a hypervisor 610, one or more virtual machines 620, and one or more virtual processors 630A-B. The one or more virtual processors 630A-B includes a real time virtual processor 630B and a housekeeping virtual processor 630A. The housekeeping virtual processor 630A is configured to initiate a non-preemptible task 640 and responsive to initiating the non-preemptible task 640, increment a counter value 650 from an initial counter value 652. The housekeeping virtual processor 630A is also configured to complete the non-preemptible task 640 and responsive to completing the non-preemptible task 640, decrement the counter value 650 towards the initial counter value 650A. Responsive to the counter value 650 reaching the initial counter value 650A, the virtual housekeeping processor 630A is configured to check a flag 670 set by the hypervisor 610. Responsive to checking the flag 670, the housekeeping processor 630A is configured to execute a hypercall 680 to yield a processor 690 associated with the housekeeping virtual processor 630A.

Figure 7:
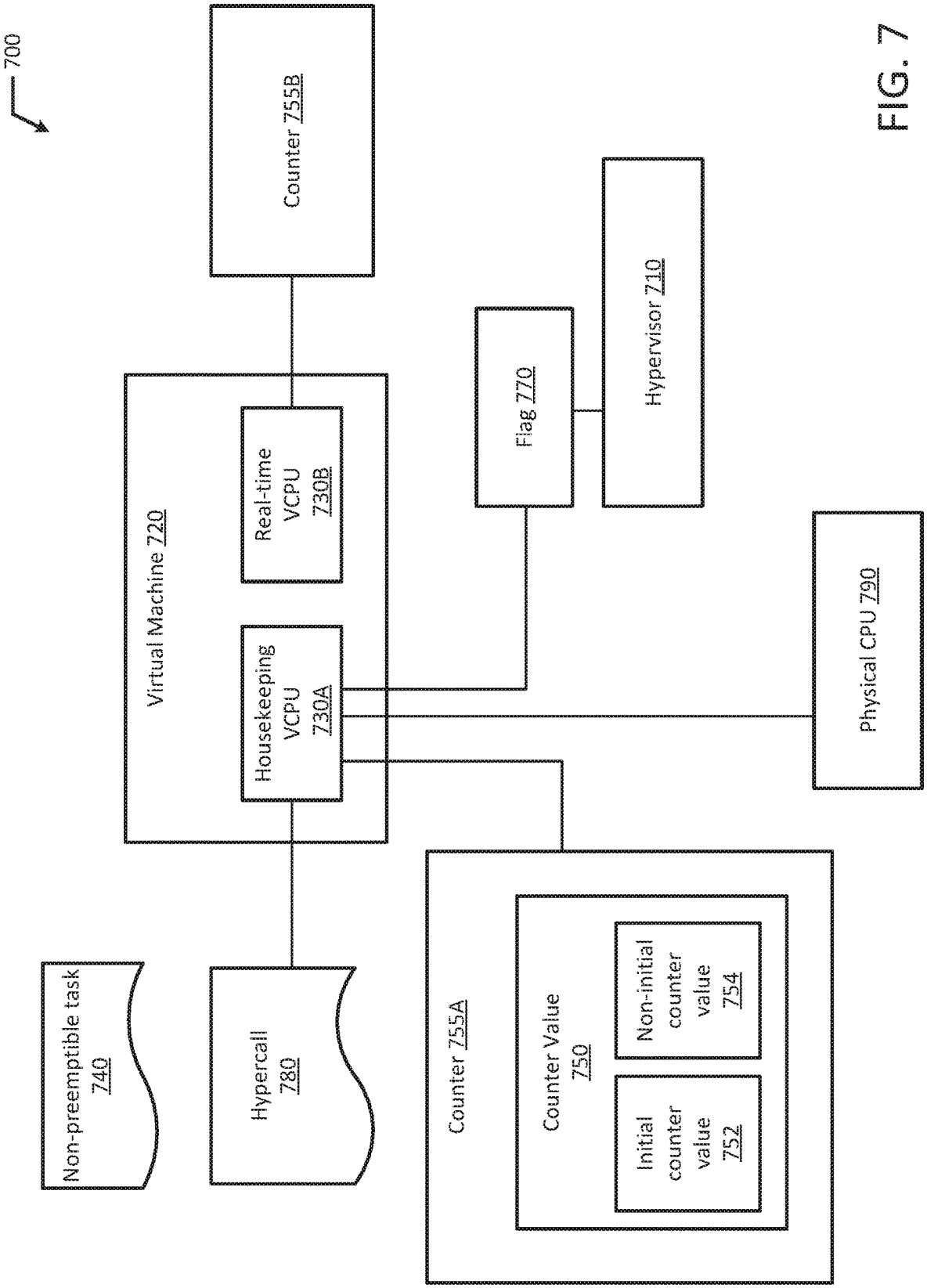
FIG. 7 illustrates a block diagram of an example housekeeping virtual processor overcommit system according to an example embodiment of the present disclosure.

FIG. 7 is a block diagram of an example VCPU overcommit system 700 according to an example embodiment of the present disclosure. The virtual CPU overcommit system 700 includes a hypervisor 710, one or more virtual machines 720, and a plurality of VCPUs 730A-B. The plurality of VCPUs 730A-B includes at least one real time VCPU 730A and at least one housekeeping VCPU 730B. The plurality of VCPUs 730A-B are configured to initiate a non-preemptible task 740 and responsive to initiating the non-preemptible task 740, increment a counter value 750 of a respective counter 755A of a respective VCPU 730A of the plurality of VCPUs 730A-B. The respective counter value 750 is incremented from an initial counter value 752. The plurality of VCPUs 730A-B are configured to complete the non-preemptible task 740, and responsive to completing the non-preemptible task 740, decrement the respective counter value 750 towards the initial counter value 752. Responsive to the respective counter value 750 reaching the initial counter value 752, the plurality of VCPUs 730A-B are configured to check a flag 770 set by the hypervisor 710, and responsive to checking the flag 770, execute a hypercall 780 to yield a physical CPU 790 associated with the respective VCPU 730A.

It will be appreciated that all of the disclosed methods and procedures described herein can be implemented using one or more computer programs or components. These components may be provided as a series of computer instructions on any conventional computer readable medium or machine readable medium, including volatile or non-volatile memory, such as RAM, ROM, flash memory, magnetic or optical disks, optical memory, or other storage media. The instructions may be provided as software or firmware, and/or may be implemented in whole or in part in hardware components such as ASICs, FPGAs, DSPs or any other similar devices. The instructions may be configured to be executed by one or more processors, which when executing the series of computer instructions, performs or facilitates the performance of all or part of the disclosed methods and procedures.

Aspects of the subject matter described herein may be useful alone or in combination with one or more other aspects described herein. In a 1st exemplary aspect of the present disclosure a system includes a hypervisor, one or more virtual machines, and one or more virtual processors. The one or more virtual processors includes a real time virtual processor and a housekeeping virtual processor. The housekeeping virtual processor is configured to initiate a non-preemptible task and responsive to initiating the non-preemptible task, increment a counter value from an initial counter value. The housekeeping virtual processor is also configured to complete the non-preemptible task and responsive to completing the non-preemptible task, decrement the counter value towards the initial counter value. Responsive to the counter value reaching the initial counter value, the virtual housekeeping processor is configured to check a flag set by the hypervisor. Responsive to checking the flag, the housekeeping process is configured to execute a hypercall to yield a processor associated with the housekeeping virtual processor.

In accordance with a 2nd exemplary aspect of the present disclosure, which may be used in combination with any one or more of the preceding aspects (e.g., the 1st aspect), the non-preemptible task is protected by a lock.

In accordance with a 3rd exemplary aspect of the present disclosure, which may be used in combination with any one or more of the preceding aspects (e.g., the 2nd aspect), the lock is a spinlock.

In accordance with a 4th exemplary aspect of the present disclosure, which may be used in combination with any one or more of the preceding aspects (e.g., the 3rd aspect), the spinlock is a raw spinlock.

In accordance with a 5th exemplary aspect of the present disclosure, which may be used in combination with any one or more of the preceding aspects (e.g., the 1st aspect), the non-preemptible task excludes other processors from accessing a data structure.

In accordance with a 6th exemplary aspect of the present disclosure, which may be used in combination with any one or more of the preceding aspects (e.g., the 1st aspect), the real time virtual processor is a VCPU.

In accordance with a 7th exemplary aspect of the present disclosure, which may be used in combination with any one or more of the preceding aspects (e.g., the 1st aspect), the housekeeping virtual processor is a VCPU.

In accordance with an 8th exemplary aspect of the present disclosure, which may be used in combination with any one or more of the preceding aspects (e.g., the 1st aspect), the one or more virtual machines includes a real time virtual machine, and the one or more virtual processors further includes a second real time virtual processor.

In accordance with a 9th exemplary aspect of the present disclosure (e.g., the 8th aspect), which may be used in combination with any one or more of the preceding aspects, the real time virtual machine includes the real time virtual processor and the second real time virtual processor.

In accordance with a 10th exemplary aspect of the present disclosure, which may be used in combination with any one or more of the preceding aspects (e.g., the 1st aspect), the one or more virtual machines includes a housekeeping virtual machine, and the one or more virtual processors further includes a second housekeeping virtual processor.

In accordance with an 11th exemplary aspect of the present disclosure, which may be used in combination with any one or more of the preceding aspects (e.g., the 10th aspect), the housekeeping virtual machine includes the housekeeping virtual processor and the second housekeeping virtual processor.

In accordance with a 12th exemplary aspect of the present disclosure, which may be used in combination with any one or more of the preceding aspects (e.g., the 1st aspect), the system further comprises a physical processor, wherein the physical processor is configured to operate the housekeeping virtual processor.

In accordance with a 13th exemplary aspect of the present disclosure, which may be used in combination with any one or more of the preceding aspects (e.g., the 1st aspect), the initial counter value is zero.

Aspects of the subject matter described herein may be useful alone or in combination with one or more other aspects described herein. In a 14th exemplary aspect of the present disclosure a system includes a hypervisor, one or more virtual machines, and a plurality of VCPUs. The plurality of VCPUs includes at least one real time VCPU and at least one housekeeping VCPU. The plurality of VCPUs are configured to initiate a non-preemptible task and responsive to initiating the non-preemptible task, increment a counter value of a respective counter of a respective VCPU of the plurality of VCPUs. The respective counter value is incremented from an initial counter value. The plurality of VCPUs are configured to complete the non-preemptible task, and responsive to completing the non-preemptible task, decrement the respective counter value towards the initial counter value. Responsive to the respective counter value reaching the initial counter value, the plurality of VCPUs are configured to check a flag set by the hypervisor, and responsive to checking the flag, execute a hypercall to yield a CPU associated with the respective VCPU.

In accordance with a 15th exemplary aspect of the present disclosure, which may be used in combination with any one or more of the preceding aspects (e.g., the 14th aspect), the non-preemptible task is protected by a spinlock.

In accordance with a 16th exemplary aspect of the present disclosure, which may be used in combination with any one or more of the preceding aspects (e.g., the 14th aspect), the one or more virtual machines includes a real time virtual machine, and the at least one real time VCPU includes a first real time VCPU and a second real time VCPU.

In accordance with a 17th exemplary aspect of the present disclosure, which may be used in combination with any one or more of the preceding aspects (e.g., the 16th aspect), the real time virtual machine includes the first real time VCPU and the second real time VCPU.

In accordance with an 18th exemplary aspect of the present disclosure, which may be used in combination with any one or more of the preceding aspects (e.g., the 14th aspect), the one or more virtual machines includes a housekeeping virtual machine, and the at least one housekeeping VCPU includes a first housekeeping VCPU and a second housekeeping VCPU.

In accordance with a 19th exemplary aspect of the present disclosure, which may be used in combination with any one or more of the preceding aspects (e.g., the 18th aspect), the housekeeping virtual machine includes the housekeeping virtual processor and the second housekeeping virtual processor.

In accordance with a 20th exemplary aspect of the present disclosure, which may be used in combination with any one or more of the preceding aspects (e.g., the 14th aspect), the system further comprises a physical processor, wherein the physical processor is configured to operate the plurality of VCPUs.

Aspects of the subject matter described herein may be useful alone or in combination with one or more other aspects described herein. In a 21st exemplary aspect of the present disclosure a method includes performing, by a housekeeping virtual processor, a non-preemptible task. Responsive to initiating the non-preemptible task, the housekeeping virtual processor increments a counter value from an initial counter value. The housekeeping virtual process completes the non-preemptible task, and responsive to completing the non-preemptible task, the housekeeping virtual processor decrements the counter value towards the initial counter value. Responsive to the counter value reaching the initial counter value, the housekeeping virtual processor checks a flag set by a hypervisor. Responsive to checking the flag, the housekeeping virtual processor executes a hypercall to yield a CPU associated with the housekeeping virtual processor.

In accordance with a 22nd exemplary aspect of the present disclosure, which may be used in combination with any one or more of the preceding aspects (e.g., the 21st aspect), the counter is a per-processor counter for all virtual processors.

In accordance with a 23rd exemplary aspect of the present disclosure, which may be used in combination with any one or more of the preceding aspects (e.g., the 21st aspect), initiating the non-preemptible task includes taking a spinlock.

In accordance with a 24th exemplary aspect of the present disclosure, which may be used in combination with any one or more of the preceding aspects (e.g., the 23rd aspect), the spinlock is a raw spinlock.

In accordance with a 25th exemplary aspect of the present disclosure, which may be used in combination with any one or more of the preceding aspects (e.g., the 23rd aspect), completing the non-preemptible task includes releasing the spinlock.

In accordance with a 26th exemplary aspect of the present disclosure, which may be used in combination with any one or more of the preceding aspects (e.g., the 21st aspect), the flag indicates an instruction as one of yield the physical processor to a different task and resume execution of the housekeeping virtual processor.

In accordance with a 27th exemplary aspect of the present disclosure, which may be used in combination with any one or more of the preceding aspects (e.g., the 21st aspect), the flag is set by the hypervisor when a flag value is set to a predetermined value.

In accordance with a 28th exemplary aspect of the present disclosure, which may be used in combination with any one or more of the preceding aspects (e.g., the 21st aspect), the hypercall passes an instruction parameter to a host operating system.

In accordance with a 29th exemplary aspect of the present disclosure, which may be used in combination with any one or more of the preceding aspects (e.g., the 21st aspect), a CPU associated with the housekeeping VCPU is yielded to start executing a different housekeeping VCPU.

In accordance with a 30th exemplary aspect of the present disclosure, which may be used in combination with any one or more of the preceding aspects (e.g., the 21st aspect), the CPU associated with the housekeeping, VCPU is yielded to execute another process on a host operating system.

Aspects of the subject matter described herein may be useful alone or in combination with one or more other aspects described herein. In a 31st exemplary aspect of the present disclosure a method includes checking, by a hypervisor, whether a counter value associated with a VCPU is a non-initial counter value. The counter value is incremented and decremented from an initial value. Responsive to checking the non-initial counter value, the hypervisor sets a flag. Additionally, the hypervisor resumes guest execution.

In accordance with a 32nd exemplary aspect of the present disclosure, which may be used in combination with any one or more of the preceding aspects (e.g., the 31st aspect), resuming guest execution includes sending an instruction to a virtual machine.

In accordance with a 33rd exemplary aspect of the present disclosure, which may be used in combination with any one or more of the preceding aspects (e.g., the 32nd aspect), the instruction is VMENTER.

In accordance with a 34th exemplary aspect of the present disclosure, which may be used in combination with any one or more of the preceding aspects (e.g., the 31st aspect), the VCPU is a housekeeping VCPU.

In accordance with a 35th exemplary aspect of the present disclosure, which may be used in combination with any one or more of the preceding aspects (e.g., the 34th aspect), the counter is a per-CPU counter for the housekeeping VCPU.

Aspects of the subject matter described herein may be useful alone or in combination with one or more other aspects described herein. In a 36th exemplary aspect of the present disclosure a system includes a means for initiating a non-preemptible task and a means for incrementing a counter value from an initial counter value responsive to taking the spinlock. The system also includes a means for completing the non-preemptible task, a means for decrementing the counter value responsive to completing the non-preemptible task, a means for checking a flag set by a hypervisor responsive to the counter value reaching the initial counter value, and a means for executing a hypercall to yield a CPU associated with the VCPU responsive to checking the flag.

Aspects of the subject matter described herein may be useful alone or in combination with one or more other aspects described herein. In a 37th exemplary aspect of the present disclosure a non-transitory machine-readable medium stores code, which when executed by a processor, is configured to cause a housekeeping VCPU to initiate a non-preemptible task, and responsive to initiating the non-preemptible task, increment a counter value from an initial counter value. Additionally, the non-transitory machine-readable medium is configured to cause the housekeeping VCPU to complete the non-preemptible task, and responsive to completing the non-preemptible task, decrement the counter value towards the initial counter value. Responsive to the counter value reaching the initial counter value, the housekeeping VCPU is caused to check a flag set by a hypervisor. Additionally, the housekeeping VCPU is configured to execute a hypercall to yield a CPU associated with the housekeeping VCPU responsive to checking the flag.

It should be understood that various changes and modifications to the example embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A system comprising:
    a hypervisor;
    one or more virtual machines; and
    one or more virtual processors, associated with on one or more physical processors, including a real time virtual processor adapted to perform real time data processing and a housekeeping virtual processor adapted to perform non-real time data processing for housekeeping tasks, wherein the housekeeping virtual processor is configured to:
    initiate a non-preemptible, non-real time housekeeping task that includes acquiring a lock,
    responsive to initiating the non-preemptible, non-real time housekeeping task, increment a counter value from an initial counter value, wherein a respective counter value greater than the initial counter value indicates that the housekeeping virtual processor is in a respective critical section of a plurality of respective critical sections,
    complete the non-preemptible, non-real time housekeeping task, wherein completing the non-preemptible, non-real time housekeeping task includes releasing the lock,
    responsive to completing the non-preemptible, non-real time housekeeping task, decrement the counter value towards the initial counter value,
    responsive to the counter value reaching the initial counter value, check a flag and determine a status of the flag as one of (i) set by the hypervisor to yield on unlock and (ii) unset, and
    responsive to checking the flag and determining the status as set by the hypervisor to yield on unlock, execute a hypercall to yield a processor of the one or more physical processors associated with the housekeeping virtual processor after the housekeeping virtual processor has completed each of the respective critical sections.

2. The system of claim 1, wherein the non-preemptible, non-real time housekeeping task is protected by a lock.

3. The system of claim 2, wherein the lock is a spinlock.

4. The system of claim 3, wherein the spinlock is a raw spinlock.

5. The system of claim 1, wherein the non-preemptible, non-real time housekeeping task excludes other processors from accessing a data structure.

6. The system of claim 1, wherein the real time virtual processor is a VCPU.

7. The system of claim 1, wherein the housekeeping virtual processor is a VCPU, and the housekeeping virtual processor is configured to at least one of remove a log and archive a log.

8. The system of claim 1, wherein the one or more virtual machines includes a real time virtual machine, and the one or more virtual processors further includes a second real time virtual processor.

9. The system of claim 8, wherein the real time virtual machine includes the real time virtual processor and the second real time virtual processor.

10. The system of claim 1, wherein the one or more virtual machines includes a housekeeping virtual machine, and the one or more virtual processors further includes a second housekeeping virtual processor.

11. The system of claim 10, wherein the housekeeping virtual machine includes the housekeeping virtual processor and the second housekeeping virtual processor, wherein at least one of the housekeeping virtual processor and the second housekeeping virtual processor are configured to perform batch data processing.

12. The system of claim 1, further comprising a physical processor, wherein the physical processor is configured to operate the housekeeping virtual processor.

13. The system of claim 1, wherein the initial counter value is zero.

14. A method comprising:
    checking, by a hypervisor, whether a counter value associated with a housekeeping VCPU is a non-initial counter value,
        wherein the counter value is incremented from an initial counter value responsive to the housekeeping VCPU initiating a non-preemptible, non-real time housekeeping task that includes acquiring a lock,
        wherein a respective counter value above the initial counter value indicates that the housekeeping VCPU is in a respective critical section of a plurality of respective critical sections,
        wherein the counter value is decremented towards the initial counter value by the housekeeping VCPU responsive to the housekeeping VCPU completing the non-preemptible, non-real time housekeeping task, which includes releasing the lock, and wherein the housekeeping VCPU is configured to perform non-real time data processing for housekeeping tasks and handle at least one of maintenance and clean up tasks;

responsive to checking the non-initial counter value, setting, by the hypervisor, a flag that indicates an instruction to yield on unlock;

resuming, by the hypervisor, guest execution until the housekeeping VCPU has completed each of the respective critical sections; and responsive to the housekeeping VCPU completing each of the respective critical sections, yielding, by the hypervisor, the housekeeping VCPU to another process.

15. The method of claim 14, wherein resuming guest execution includes sending an instruction to a virtual machine.

16. The method of claim 15, wherein the instruction is VMENTER.

17. The method of claim 14, wherein the housekeeping VCPU is configured to at least one of remove a log, archive a log, delete a temporary file, and clean up computer disk storage.

18. The method of claim 17, wherein the counter is a per-CPU counter for the housekeeping VCPU.

19. A non-transitory machine-readable medium storing code, which when executed by a processor, is configured to cause a housekeeping VCPU, which is adapted to perform non-real time data processing for housekeeping tasks, to:

initiate a non-preemptible, non-real time housekeeping task that includes acquiring a lock;

responsive to initiating the non-preemptible, non-real time housekeeping task, increment a counter value from an initial counter value, wherein a respective counter value greater than the initial counter value indicates that the housekeeping VCPU is in a respective critical section of a plurality of respective critical sections;

complete the non-preemptible task, wherein completing the non-preemptible, non-real time housekeeping task includes releasing the lock;

responsive to completing the non-preemptible task, decrement the counter value towards the initial counter value;

responsive to the counter value reaching the initial counter value, check a flag and determine a status of the flag as one of (i) set by a hypervisor to yield on unlock and (ii) unset; and responsive to checking the flag and determining the status as set by the hypervisor to yield on unlock, execute a hypercall to yield a CPU associated with the VCPU after the housekeeping virtual processor has completed each of the respective critical sections.

20. The non-transitory machine-readable medium of claim 19, wherein the lock is a spinlock.

* * * * *